EDWARD FITZHENRY.

Improvement in Machinery for Dressing Hides or Leather.

No. 118,003.

Patented August 15, 1871.

Witnesses,
S. N. Piper
L. N. Möller

E. Fitzhenry.
by his attorney.
R. H. Eddy

UNITED STATES PATENT OFFICE.

EDWARD FITZHENRY, OF BOSTON, MASSACHUSETTS, ASSIGNOR TO HIDE AND LEATHER MACHINE COMPANY, OF SAME PLACE.

IMPROVEMENT IN MACHINES FOR DRESSING LEATHER.

Specification forming part of Letters Patent No. 118,003, dated August 15, 1871.

*To all whom it may concern:*

Be it known that I, EDWARD FITZHENRY, of Boston, in the county of Suffolk and State of Massachusetts, have invented a new and useful Improvement in Machinery for Dressing Leather; and do hereby declare the same to be fully described in the following specification and represented in the accompanying drawing, of which—

Figure 1:
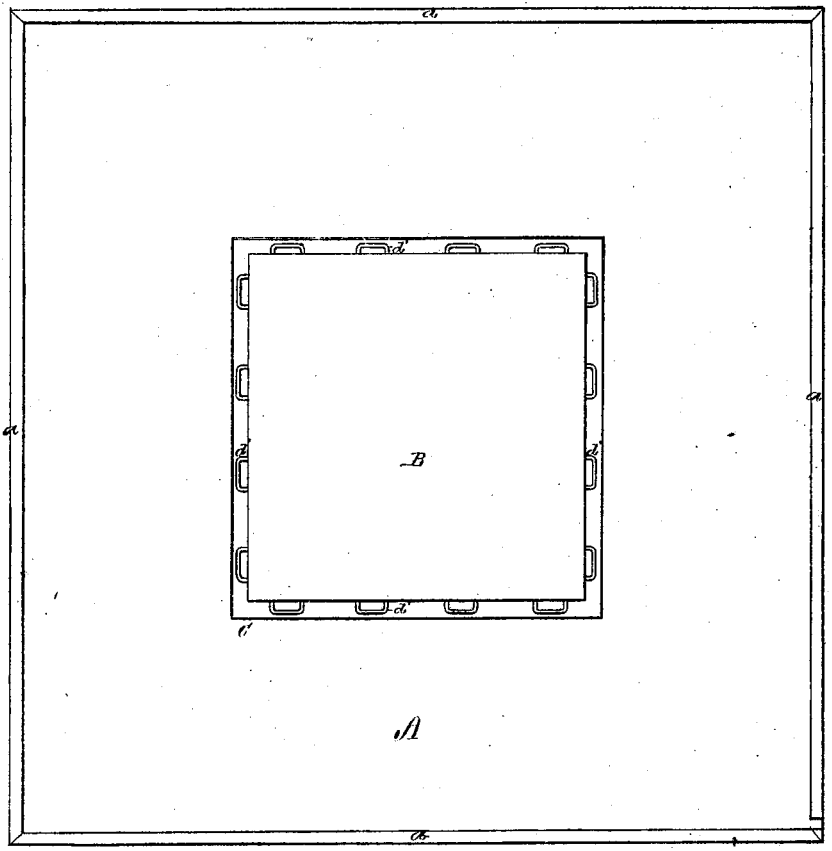
Figure 2:
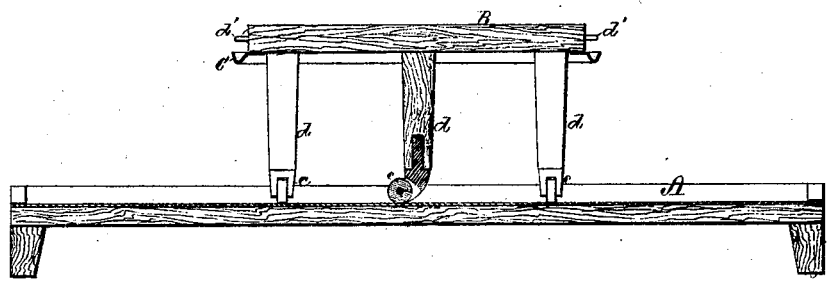

Figure 1 is a top view, and Fig. 2 a vertical section of my improved leather-dressing machine table and its supporting platform.

The said platform, shown at A, has a smooth upper surface, which is bounded by a raised lip or ledge, $a$, provided with a discharging notch, educt, or opening, $b$. A table, B, having casters $c\ c$ to its legs $d\ d$, rests on the platform so as to be movable thereon across it in any direction, or turned about on it, as occasion may require. This table has a series of handles, $d$, projecting from the edge of its top, and there surrounds the said top, and below it, as shown, a gutter, C. The said gutter is to intercept any of the grease or oily matter removed from the leather by the dressing-tool or tools, and prevent such from falling upon the table-supporting platform. The liquid discharged from the leather into the spout will, after the latter may be full, pass therefrom down upon the platform, and may be caught by or received into a suitable vessel placed under the notch or educt of the raised lip. The table and platform are supposed to make part of a leather-dressing machine, whose slicking or setting-out or dressing-tools, and the operative mechanism thereof, are also supposed to be arranged in the usual way over or above the table.

The trough of the table, by intercepting the more solid greasy matters discharged from the hide or leather by the tool or tools, prevents such from dropping on the platform and being rolled upon by the table, so as to render the surface of the platform uneven and the table when moved to move out of a horizontal plane.

The greasy matter discharged upon the platform will, by the raised ledge thereof, be intercepted, and may be caught in a vessel suitably placed at the outlet. By this means grease and other matter from the skin may be saved and utilized.

I claim—

1. The leather-dressing machine table, provided with the trough arranged with it, as described.

2. The combination of the table provided with the trough, arranged as described, and having casters to its legs, as set forth, with the platform furnished with the raised ledge and the educt, substantially as set forth.

EDWARD FITZHENRY.

Witnesses:
R. H. EDDY,
J. R. SNOW.